US011112031B2

(12) United States Patent
Binz et al.

(10) Patent No.: US 11,112,031 B2
(45) Date of Patent: Sep. 7, 2021

(54) DIAPHRAGM ASSEMBLY FOR A DIAPHRAGM VALVE, AND DIAPHRAGM VALVE

(71) Applicant: Buerkert Werke GmbH & Co. KG, Ingelfingen (DE)

(72) Inventors: Dieter Binz, Ingelfingen (DE); Gertrud Eppler, Ingelfingen (DE); Daniel Trenkamp, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 16/202,221

(22) Filed: Nov. 28, 2018

(65) Prior Publication Data

US 2019/0162317 A1   May 30, 2019

(30) Foreign Application Priority Data

Nov. 29, 2017 (DE) ...................... 10 2017 128 229.7

(51) Int. Cl.

| F16K 41/10 | (2006.01) |
| F16K 7/12 | (2006.01) |
| F16K 51/00 | (2006.01) |
| F16K 7/14 | (2006.01) |
| F16K 31/365 | (2006.01) |
| G06K 19/077 | (2006.01) |
| F16K 37/00 | (2006.01) |
| F16K 31/06 | (2006.01) |
| F16K 31/126 | (2006.01) |

(52) U.S. Cl.
CPC ............. *F16K 41/103* (2013.01); *F16K 7/12* (2013.01); *F16K 7/14* (2013.01); *F16K 31/0672* (2013.01); *F16K 31/1266* (2013.01); *F16K 31/365* (2013.01); *F16K 37/00* (2013.01); *F16K 51/00* (2013.01); *G06K 19/07758* (2013.01); *Y10T 137/8158* (2015.04); *Y10T 137/8275* (2015.04)

(58) Field of Classification Search
CPC ........ G06K 19/07758; Y10T 137/8275; Y10T 137/8158; F16K 37/00; F16K 7/14; F16K 51/00; F16K 31/0672; F16K 31/126; F16K 7/17; F16K 31/1266; F16K 41/103; F16K 7/16; F16K 31/365; F16K 7/18; F16K 7/12

See application file for complete search history.

(56) References Cited

U.S. PATENT DOCUMENTS

| 9,046,180 B2 | 6/2015 | Matalon | |
| 9,157,534 B2 | 10/2015 | Matalon | |
| 2011/0094609 A1* | 4/2011 | Schroder | ................ F16K 7/126 137/560 |

(Continued)

FOREIGN PATENT DOCUMENTS

DE   102015210204 A1   12/2016

*Primary Examiner* — Atif H Chaudry
(74) *Attorney, Agent, or Firm* — Dilworth IP, LLC

(57) ABSTRACT

A diaphragm assembly for a diaphragm valve is described, which has a diaphragm which includes a functional portion adapted to cooperate with further components of the diaphragm valve and to separate opposite chambers. The diaphragm further includes a tab projecting laterally from the functional portion and having a through-opening provided therein. A marking element is fastened in the through-opening. In addition, a diaphragm valve having such a diaphragm assembly is presented.

15 Claims, 6 Drawing Sheets

(56) References Cited

U.S. PATENT DOCUMENTS

2012/0217307 A1\* 8/2012 Martin ............... G06K 7/10178
235/492
2015/0083247 A1 3/2015 Schroder
2018/0163895 A1\* 6/2018 Mueller ................... F16K 7/12

\* cited by examiner

DIAPHRAGM ASSEMBLY FOR A DIAPHRAGM VALVE, AND DIAPHRAGM VALVE

FIELD OF THE INVENTION

The invention relates to a diaphragm assembly for a diaphragm valve, including a diaphragm which includes a functional portion adapted to cooperate with further components of the diaphragm valve and to separate opposite chambers, and a tab projecting laterally from the functional portion.

The invention further relates to a diaphragm valve including such a diaphragm assembly.

BACKGROUND

Diaphragm valves including diaphragm assemblies are known from the prior art. DE 10 2015 210 204 A1, US 2015/0083247 A1, U.S. Pat. No. 9,046,180 B2 and U.S. Pat. No. 9,157,534 B2, for example, show diaphragm assemblies and diaphragm valves of the type mentioned at the outset.

Both single-layer and also multilayer diaphragms are used here. Single-layer diaphragms may, for example, be made of ethylene propylene diene rubber (EPDM). In addition to a layer of elastomer material, multi-layer diaphragms include, for example, a layer of polytetrafluoroethylene (PTFE).

Diaphragms that have been built into an associated diaphragm valve are no longer visible from the outside. This is a disadvantage if the diaphragms have to be replaced, e.g. as part of a maintenance measure, since in that case it cannot be seen from the outside which type of diaphragm is installed in the diaphragm valve.

For this reason, diaphragms that have an integrally formed tab have become known. The tabs project from the functional portion of the diaphragm in such a way that they are visible even if the diaphragm is in the installed state. The tab thus projects in relation to the associated diaphragm valve. Since the tab has the same structure as the diaphragm, the tab can be used to at least roughly identify the type of diaphragm. For example, it can be determined whether the diaphragm involved is single-layer or multilayer and which materials were used for the various layers. To this end, of course, the materials used need to be able to be visually distinguished.

Since the machines or systems in which the diaphragm valve concerned is installed usually have to be shut down during diaphragm replacement, it is important, for the purpose of a rapid diaphragm replacement process, that the diaphragm type can be identified quickly and reliably. In particular, this must also be possible for installation spaces that are difficult to access and difficult to view. An error in determining the type of diaphragm can lead to time delays in the diaphragm replacement process. In the event that an unsuitable diaphragm is inadvertently installed in the diaphragm valve, malfunctions of the diaphragm valve may occur. It is imperative to avoid this.

It is therefore the object of the invention to indicate a diaphragm assembly and an associated diaphragm valve in which, in the installed state of the diaphragm, the type of diaphragm can be determined particularly quickly and reliably. In particular, it is intended here that the materials used for manufacturing the diaphragm can be determined.

SUMMARY

The present invention provides a diaphragm assembly of the type mentioned above, in which a through-opening is provided in the tab and a marking element is fastened in the through-opening. The through-opening here extends from an upper side of the diaphragm, more precisely of the tab, to a lower side of the diaphragm, more precisely of the tab. The fact that the marking element is arranged in the through-opening means that it is arranged laterally on an associated diaphragm valve in the installed state of the diaphragm. In other words, the marking element projects in relation to the diaphragm valve. This allows the marking element to be identified easily and reliably. After the marking element has been fastened in the through-opening, it is visible at least from two sides. The type of marking element allows conclusions to be drawn here about the type of diaphragm. For example, in this context, marking elements of different colors or different shapes can be used for marking different types of diaphragm. This allows the diaphragm type to be determined quickly and simply.

The functional portion adapted to cooperate with further components of the diaphragm valve and to separate opposite chambers is the portion which, on the one hand, comes into contact with the fluid that can be shut off by the valve and, on the other hand, in the case of a hydraulically or pneumatically actuated diaphragm valve, comes into contact with the activation fluid. The functional portion further comprises the surrounding clamping section in which the diaphragm is clamped between two housing parts. The tab projects outward from the clamping section.

The diaphragm may be single-layer or multilayer. In the case of a multilayer diaphragm, the through-opening extends through all layers of the diaphragm.

In a preferred embodiment, the diaphragm when in its installation position comprises an upper side and a lower side, and the marking element has substantially the same color as the lower side and/or is made from the same material as the lower side. This allows a conclusion to be drawn from the clearly visible marking element to the diaphragm type in a simple and reliable manner. This is advantageous in particular for multilayer diaphragms if the tab is visible only from one side. In most cases, the diaphragm in its installation position is visible only from above. This means that layers of the diaphragm that are oriented toward the lower side cannot be immediately identified. The marking element, however, now allows the information about the material of the layer provided on the lower side of the diaphragm to be recognized also from above. In addition, if the marking element has the same color as the lower side of the diaphragm, the material of the marking element can advantageously be selected independently of the material of the diaphragm. In this connection, a particularly cost-effective material can be used for the marking element. It is also possible to select a material having properties such as mechanical properties which are of advantage to the marking element, e.g. shock resistance. Altogether, in this way the information about the diaphragm type is made available on the upper side of the diaphragm in a reliable and simple manner.

Advantageously, the marking element is visible from a viewing direction directed onto the upper side. Diaphragm valves are usually accessible and/or viewable from this side. The lower side usually has lines or pipes arranged thereon which are connected to the diaphragm valve. The visibility from above therefore generally results in a reliable way of ascertaining the diaphragm type.

Moreover, the marking element may protrude in relation to an upper boundary surface and/or in relation to a lower boundary surface of the diaphragm. The upper boundary surface of the diaphragm may correspond to the upper side here and the lower boundary surface may correspond to the lower side. In this way, the marking element is clearly visible even from directions that are at an angle to a central axis of the through-opening. In an extreme case, the protruding parts of the marking element may be visible from a direction substantially perpendicular to the central axis of the through-opening. This results in a visibility of the marking element from almost all directions.

In one variant, the marking element includes at least one lateral extension for retaining the marking element in the through-opening. The extension may be wholly or partly circumferential here. Preferably, the geometry of the extension is configured in such a way that it blocks the marking element from passing through the through-opening at least in one direction. This means that the marking element is held in the through-opening with a form fit at least in this direction. If the marking element has a plurality of extensions, the marking element may also be held with a form fit in several directions. The section extending through the diaphragm constitutes an undercut by means of the extension(s).

In the event the marking element is cylindrical, in particular circular cylindrical, at least one of the axial ends of the marking element has a thickened portion compared to a middle portion of the marking element. This may be a thickened diameter portion, in particular a thickened diameter portion extending around the entire circumference. It has the shape of a collar, a head or a cap, for example. Cylindrical marking elements that have a thickened diameter portion at only one of the axial ends may also be referred to as mushroom-shaped.

The marking element may also include two lateral extensions for retaining the marking element in the through-opening, the lateral extensions being arranged on opposite sides of the diaphragm in the assembled state. This means that in the assembled state, one extension is arranged on the upper side and one extension is arranged on the lower side. Again, the extensions may be wholly or partly circumferential with respect to a central axis of the through-opening. In the case of cylindrical, in particular circular cylindrical marking elements, both axial ends then each exhibit a thickened portion, in particular a thickened diameter portion, in relation to a middle portion of the marking element. This effectively prevents the marking element from exiting the through-opening.

A marking element with two extensions may have a one-piece or two-piece design. In the case of a one-piece marking element, it can be inserted into the through-opening, utilizing the elasticity of the diaphragm material. After insertion of the marking element, the diaphragm elastically moves into a middle portion of the marking element, thus holding it with a form fit. This also applies in particular to cylindrical and circular cylindrical marking elements.

According to one embodiment, the marking element is a tag having a fastening ring which engages through the through-opening. The tag is reliably held in the through-opening and thus at the diaphragm by means of the fastening ring. The tag carries information on the diaphragm type, in particular on the material of one or more diaphragm layers. To this end, the tag may have a particular color or be made from a particular material. The tag may also have information impressed therein in the form of alphanumeric characters. In the installed state of the diaphragm assembly, the tag is suspended laterally from an associated diaphragm valve. In this way, it can be reliably ascertained from the outside which type of diaphragm is installed.

In an alternative embodiment, the marking element is substantially cylindrical and the through-opening has a cross-section substantially corresponding to a cross-section of the marking element. The fact that the cross-sections correspond to each other here means that they have essentially the same geometric shape and/or size. For example, the marking element is circular cylindrical, that is, it has a circular cross-section, and the through-opening is also circular in cross-section. The marking element may also have a polygonal cross-section, e.g., rectangular or triangular. In that case, the through-opening also has a polygonal cross-section.

A cylindrical marking element, in particular a circular cylindrical one, may also be referred to as pin-shaped.

Preferably, a circumference of the circular cylindrical marking element is larger than a circumference of the through-opening such that the marking element and the through-opening form an interference fit. By inserting the marking element into the through-opening, the latter is elastically expanded. The marking element is then held in the through-opening by the elastic forces. In the case of a circular cylindrical marking element, the "diameter" characteristic may also be used instead of the "circumference" characteristic. The diameter of the marking element is thus slightly larger than that of the through-opening. In all cases, the marking element is in this way reliably, i.e. in particular captively, held in the through-opening so as to be well visible.

The lateral surface of that section of the cylindrical marking element which protrudes through the through-opening may also be convex. That is, it more particularly has a larger diameter and/or circumference in a middle portion of the marking element than at the ends thereof. This facilitates the insertion of the marking element into the through-opening. In the process, an interference fit, for example, may form between the middle portion of the marking element and the through-opening.

Preferably, the marking element includes a lateral extension at each of the two axial ends for retaining the marking element in the through-opening. An axial end face of each extension facing the middle portion rests against the diaphragm. In this way, no or only very narrow gaps are produced between the axial end faces facing the middle portion and the diaphragm. This is of advantage with regard to possible deposits of foreign matter. In this way, such deposits are in fact avoided, making the diaphragm assembly also suitable for fields of application in which hygiene and cleanliness are of great importance and no gaps that favor an attachment of foreign matter may exist.

The marking element may comprise an electronic data storage element, in particular an RFID chip. In this connection, the data storage element may be inserted, e.g., in a cavity formed on the marking element. The data storage element may also be integrated in the marking element as part of a manufacturing process thereof. The data storage element may, for example, be molded or injection molded in the marking element. In all cases, the data storage element is securely connected with the marking element.

The data storage element may be fastened to the marking element such that it can be removed from it again in a non-destructive manner. The data storage element can then be replaced very easily.

The data storage element may have data stored thereon for identification of the type of diaphragm and/or in relation to the materials of the diaphragm layers. In addition or as an alternative, data relating to the history of the diaphragm, e.g. the date of manufacture of the diaphragm or data relating to the operation of the diaphragm valve in which the diaphragm is installed, may be stored on the data storage element. In this connection, diagnostic data of the diaphragm valve, a number of closing and/or opening cycles performed, a valve lift, a temperature of the medium conducted in the valve and/or an ambient temperature may also be stored.

Preferably, the marking element comprises a data readout interface for reading out data stored on the electronic data storage element and/or a data write interface for writing data to the electronic data storage element. Using these interfaces, information about the diaphragm type may be stored on, and read out again from, the data storage element. This allows the diaphragm type to be ascertained electronically. To this end, an appropriate readout device has to communicate with the data readout interface. As a result, the diaphragm type can be ascertained quickly and reliably in this way as well.

A visual display device, in particular an indicator light, may also be provided, which is coupled to the electronic data storage element. In this way, data stored on the data storage element and/or states of the diaphragm assembly and/or of the diaphragm valve can be displayed. Among other things, a diaphragm type can be displayed by means of the display device. In case the display device is an indicator light, different types of diaphragms can be displayed by means of indicator lights of different colors, for example.

Preferably, the light indicator is configured such that it emits light when a data transfer takes place. In particular in an environment in which many diaphragm valves fitted with diaphragm assemblies according to the invention are arranged in a small space, this allows verifying with the naked eye from which of the diaphragm valves data is currently being read out or to which of the diaphragm valves data is currently being written. This prevents possible errors.

In one variant, the marking element comprises at least one cutting edge which is designed to create an opening in the diaphragm. The through-opening can thus be produced by means of the marking element. In this context, the production of the through-opening and the attachment of the marking element in the through-opening preferably proceed directly consecutively in terms of time.

For example, the cutting edge is provided on a front face of a circular cylindrical marking element. The latter is then placed by its front face on the tab at that point where the marking element is to be fastened. Subsequently, the through-opening is cut into the tab by turning the marking element, for example, and the marking element is pushed into the through-opening immediately afterwards, where it can be held by an interference fit.

A method of manufacturing the diaphragm assembly thus comprises the steps of:
(a) producing the through-opening, in particular by means of a cutting edge arranged on the marking element; and
(b) subsequently fastening the marking element in the through-opening.

The marking element may be in two parts, and the two marking element parts may be snap-fitted to each other. The two marking element parts are preferably inserted into the through-opening from different sides, e.g. a first marking element part is inserted from the upper side of the diaphragm and a second marking element part from the lower side of the diaphragm. The marking element parts are then snap-fitted in the region of the through-opening, with one part preferably having a mushroom-shaped end and the other having a complementary receptacle which widens during snap-fitting.

In the case of two-part marking elements, a cutting edge may be provided on only one of the marking element parts.

Furthermore, the object is achieved by a diaphragm valve of the type mentioned at the outset having a diaphragm assembly according to the invention. In such a diaphragm valve, the type of diaphragm installed can be simply and reliably identified.

BRIEF DESCRIPTION OF THE DRAWINGS

FIGS. 1 and 2 show a diaphragm valve 10 comprising a diaphragm assembly 12.

DETAILED DESCRIPTION

Figure 1:
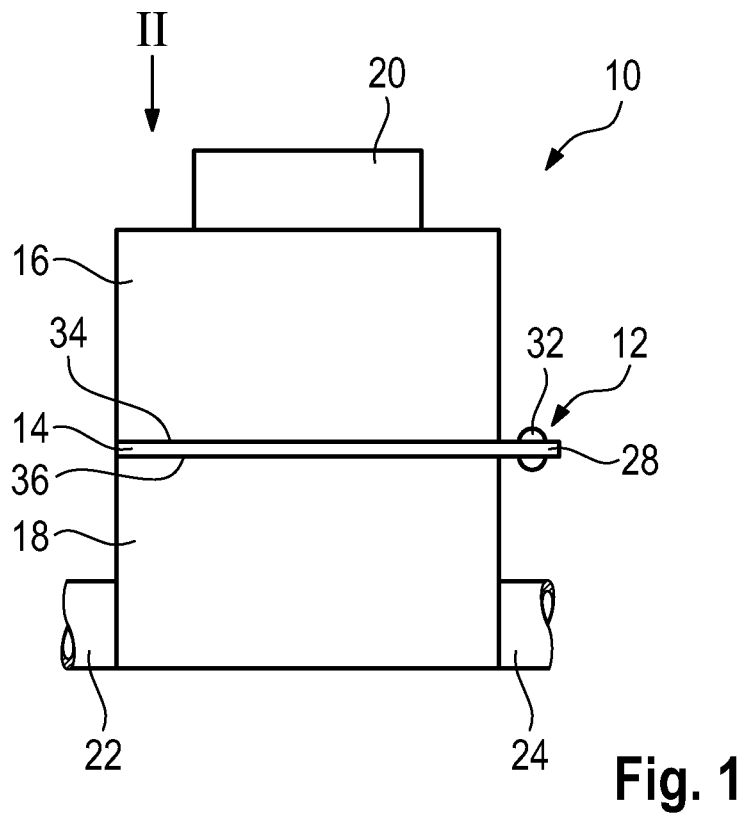
FIG. 1 shows a schematic side view of a diaphragm valve according to the invention with a diaphragm assembly according to the invention.

In the illustrated exemplary embodiment, the diaphragm assembly 12, more precisely a diaphragm 14 of the diaphragm assembly 12, is arranged between a first diaphragm valve component 16 and a second diaphragm valve component 18.

The first diaphragm valve component 16 comprises a valve actuator 20.

The diaphragm valve 10 is coupled to fluid pipes 22, 24 via the second diaphragm valve component 18.

The diaphragm assembly 12 is arranged inside the diaphragm valve 10 such that a functional portion 26 of the diaphragm 14, delimited by broken lines, can cooperate with components of the diaphragm valve 10 and can separate opposite chambers from each other as part of the valve function.

The diaphragm 14 furthermore comprises a tab 28 which projects laterally from the functional portion 26.

The tab 28 has a through-opening 30 provided therein (see FIG. 3), in which a marking element 32 is fastened.

FIGS. 3 to 6 show two embodiments of a diaphragm 14 in detail. For greater clarity, no marking element 32 is arranged in the through-opening 30 in each of the Figures here.

Figure 3:
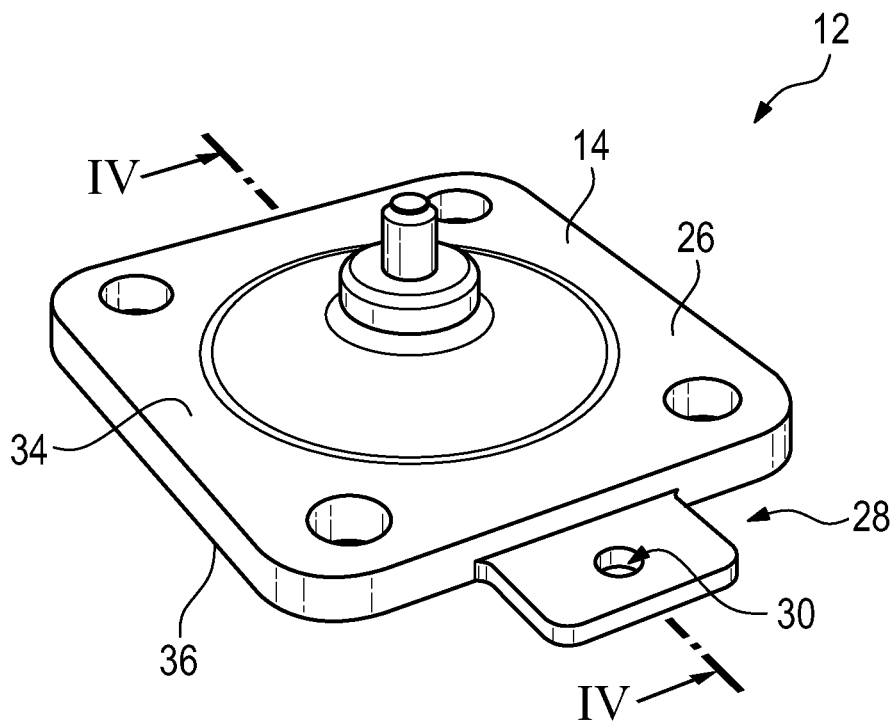
FIG. 3 shows a single-layer diaphragm of a diaphragm assembly according to a first embodiment of the invention.
Figure 4:
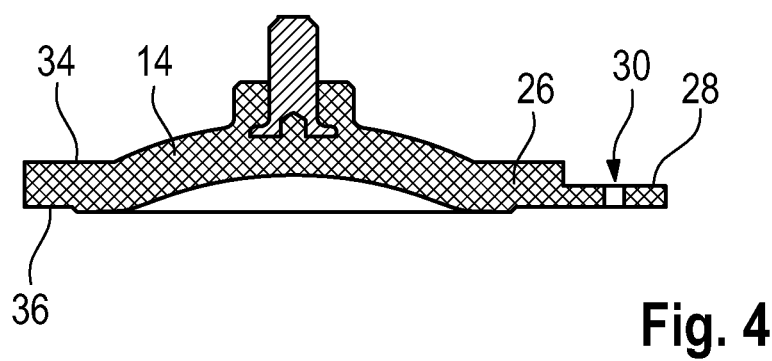
FIG. 4 shows the diaphragm from FIG. 3 in a view sectioned along IV-IV.

The embodiment according to FIGS. 3 and 4 shows a single-layer diaphragm.

Figure 5:
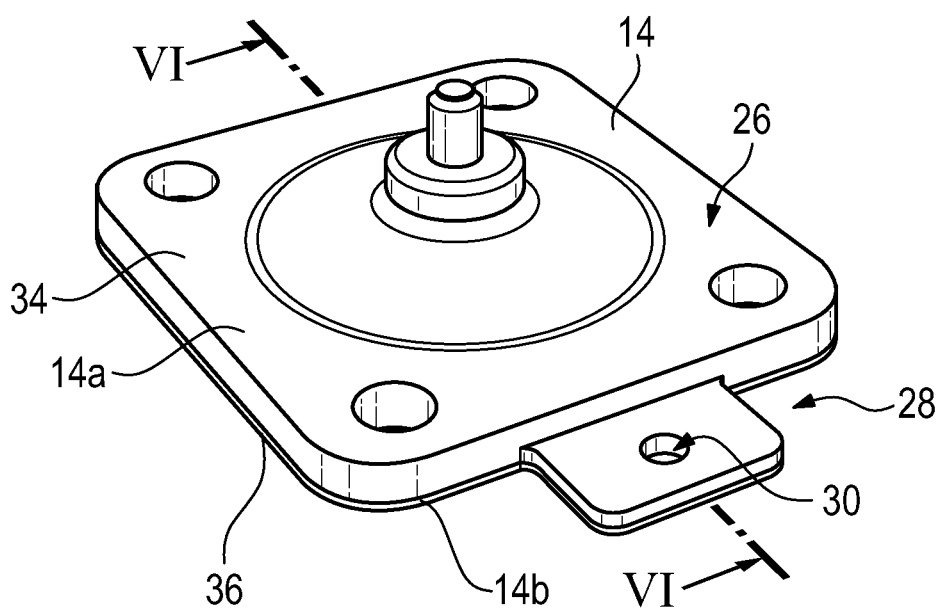
FIG. 5 shows a two-layer diaphragm of a diaphragm assembly according to a second embodiment of the invention.
Figure 6:
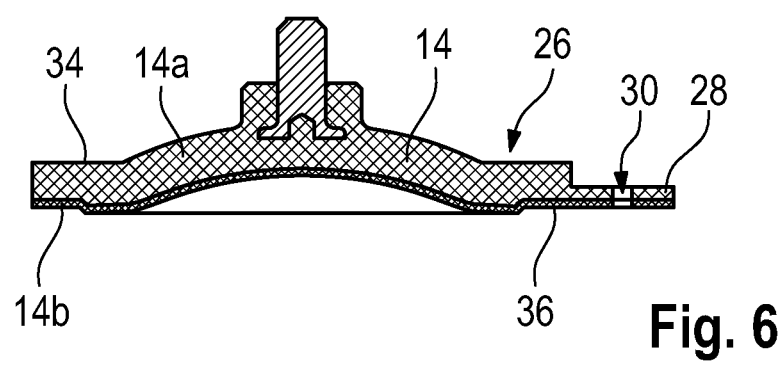
FIG. 6 shows the diaphragm from FIG. 5 in a view sectioned along VI-VI.

The diaphragm according to FIGS. 5 and 6 has a two-layer structure. A first diaphragm layer 14a is an elastomer layer. A second diaphragm layer 14b is made of PTFE.

Various embodiments of the marking element 32, which may, of course, also be fastened in the through-openings 30 of the diaphragms 14 from FIGS. 3 to 6, are apparent from FIGS. 7 to 13.

Irrespective of its embodiment, the marking element 32 serves to provide information on the diaphragm type to a user in the installed state of the diaphragm assembly 12. It is of particular importance here to identify, by means of the marking element 32, the material from which the diaphragm 14 is made.

A common case here is that when the diaphragm 14 is in an installed position (see FIG. 1), a user can only look at an upper side 34 of the diaphragm. More precisely, a user can look at the upper side 34 of the diaphragm 14 only in the region of the tab 28 and cannot see a lower side 36 of the diaphragm 14.

It is, however, important for the user to know from which material the lower side 36 of the diaphragm 14 is made (see FIGS. 5 and 6), for example in connection with maintenance work in which the diaphragm 14 is to be replaced. Only in this case, the user can have a suitable replacement diaphragm ready even before the actual removal of the diaphragm 14.

To make this possible, the marking element 32 may have substantially the same color as the lower side 36. The color of the marking element 32 can then be used to draw conclusions about the material of the lower side 36.

In an alternative embodiment, the marking element 32 is made from the same material as the lower side 36. Thus, the material of the lower side 36 can be identified from the upper side 34 in this case as well.

Figure 2:
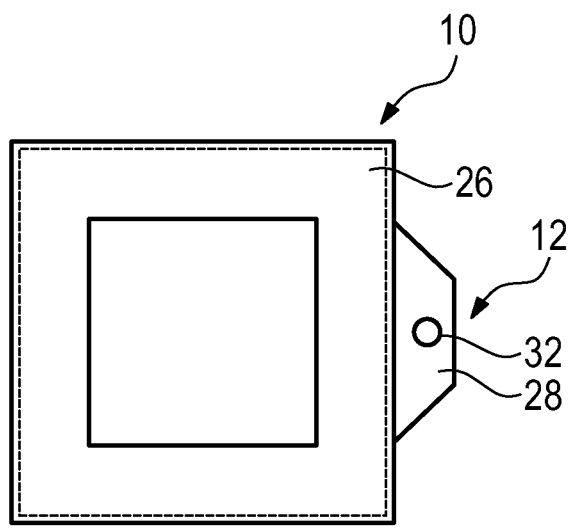
FIG. 2 shows the diaphragm valve from FIG. 1 in a top view along the direction II.

In all embodiments, the marking element 32 is visible from a viewing direction directed toward the upper side 34 (see FIG. 2, for example).

In the following, special configurations of the various embodiments of the marking element will be discussed.

Figure 8:
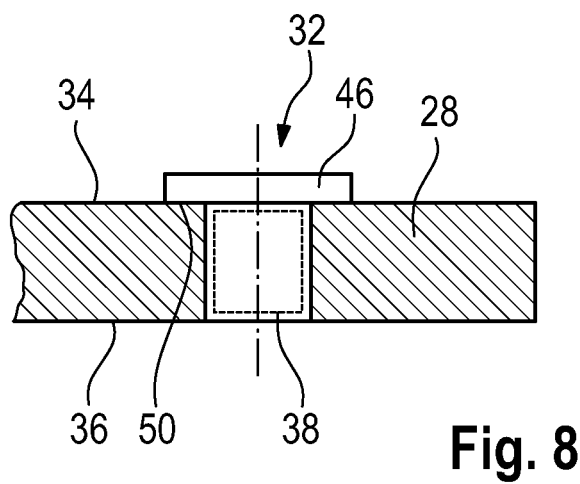
Figure 9:
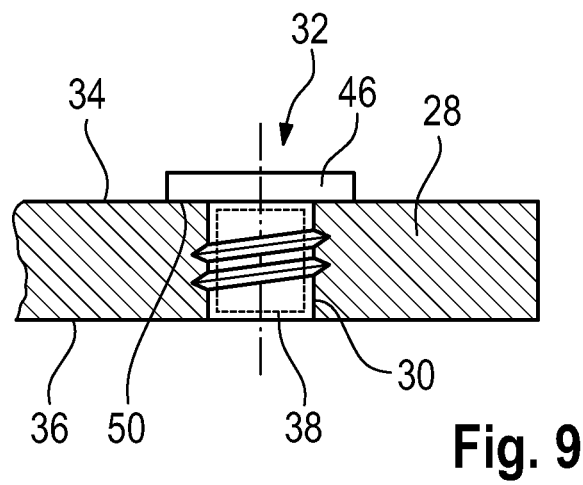

In the embodiments according to FIGS. 8 and 9, the marking element 32 protrudes in relation to an upper boundary surface, which in the present case corresponds to the upper side 34, of the diaphragm 14.

In the embodiments according to FIGS. 1, 11, 12 and 13, the marking element 32 protrudes in relation to both an upper boundary surface and a lower boundary surface of the diaphragm 14. In this case, the upper boundary surface corresponds to the upper side 34 again, and the lower boundary surface corresponds to the lower side 36.

In this way, the marking element 32 is well visible even from viewing directions that are at an angle to the upper side 34 of the diaphragm 14.

The marking element 32 further comprises an electronic data storage element 38, which is illustrated merely schematically in the Figures. More particularly, the data storage element 38 is an RFID chip.

The data storage element 38 may have information stored thereon relating to the materials from which the diaphragm 14 is made.

In addition, information about the utilization and/or about the life cycle of the diaphragm valve 10 to which the marking element 32 is assigned can be stored there.

For reading out data stored on the data storage element 38, a data readout interface is provided, which is not illustrated in more detail.

To allow data to be written to the data storage element 38, a data write interface is provided, which is also not shown in more detail.

Further provided is a visual display device 40, which is coupled to the data storage element 38.

Figure 10:
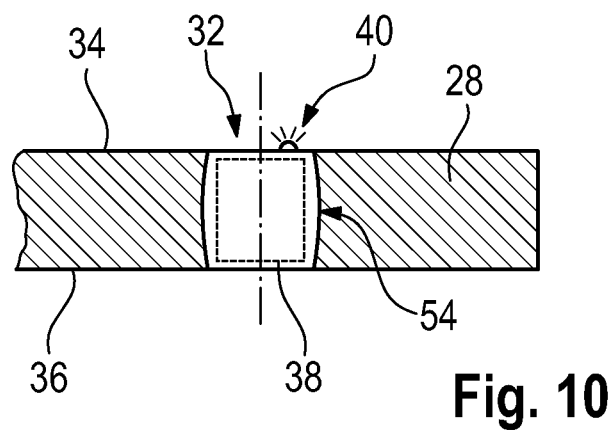
Figure 12:
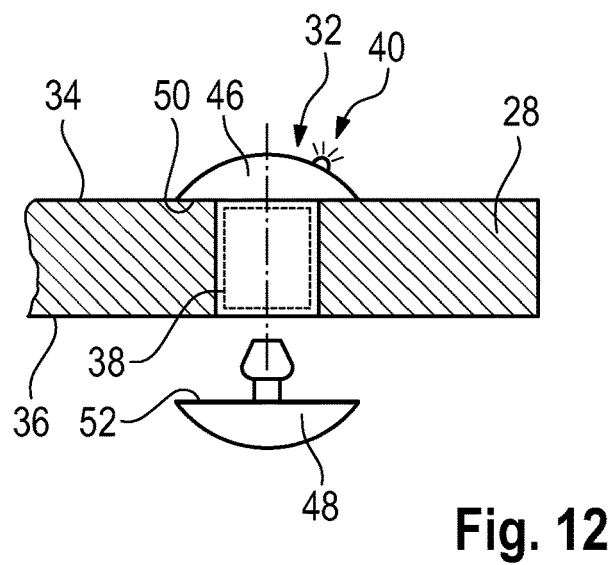

The display device 40 is illustrated by way of example only in the embodiments according to FIGS. 10 and 12. However, all other embodiments may be equipped with a display device 40 just as well.

In the examples shown, the display device 40 is an indicator light in the form of an LED, which emits light when a data transfer takes place from or to the data storage element 38. In an environment involving a plurality of diaphragm valves 10 and therefore a plurality of data storage elements 38, it can be easily seen in this way with which data storage element 38 a communication is in progress.

The display device 40 may also be arranged at a different point of the diaphragm valve 10. In particular, it may be configured as an illuminated ring on the valve actuator 20, which may also be generally referred to as a drive.

Figure 7:
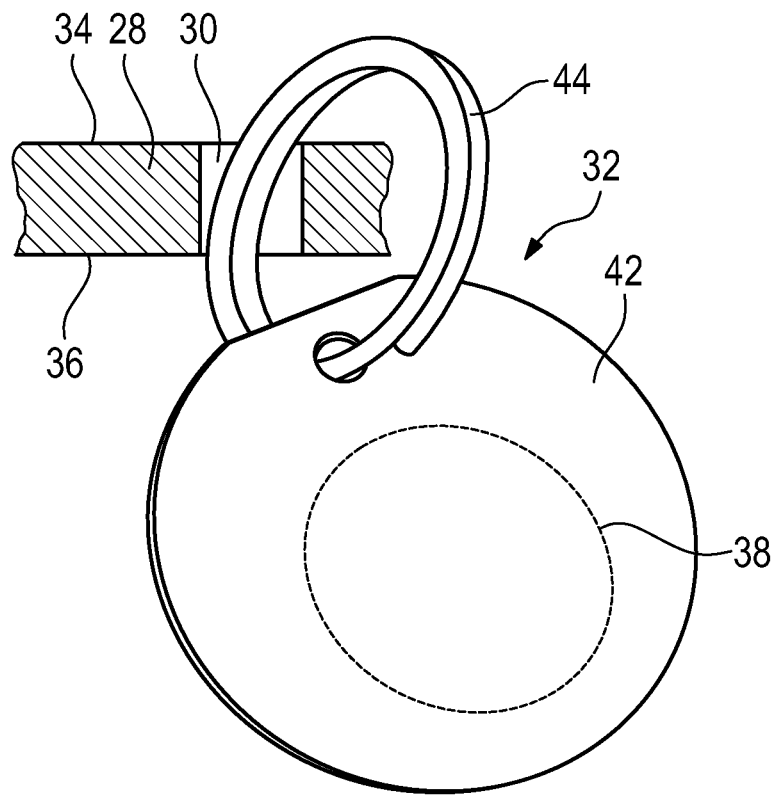
FIGS. 7 to 13 show different embodiments of a marking element of a diaphragm assembly according to the invention.

In the embodiment according to FIG. 7, the marking element 32 is a tag 42 which is fastened in the through-opening 30 by a fastening ring 44. The data storage element 38 is integrated in the tag 42.

In addition to this, further information about the diaphragm assembly 12 and/or about the diaphragm valve 10 may be stored on the tag 42, for example in the form of an inscription or an imprint.

The marking elements 32 according to FIGS. 8 and 9 include a lateral extension 46 for retaining the marking element 32 in the through-opening 30. Here, the head-like extension 46 blocks the marking element 32 from being pushed out of the through-opening 30 at least in one direction.

Figure 11:
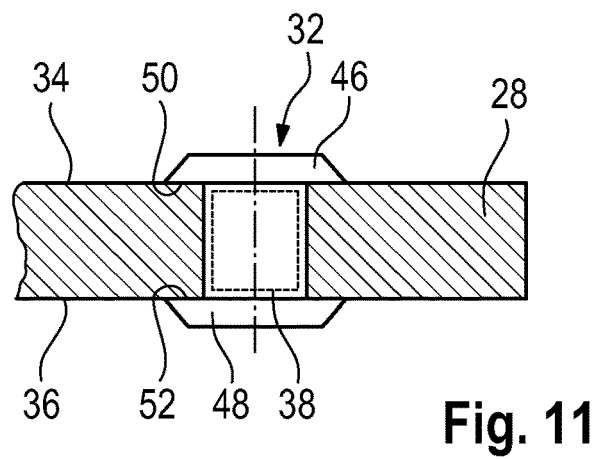
Figure 13:
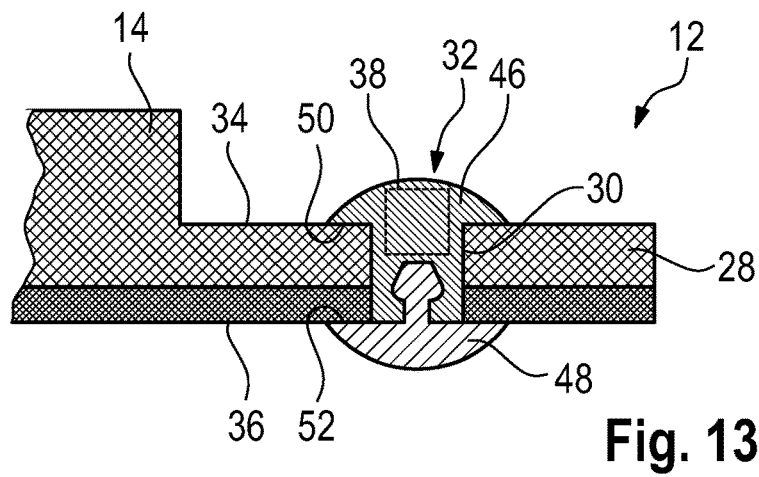

The marking elements 32 according to FIGS. 11 to 13 include two lateral extensions 46, 48 each, which are shaped like discs or lenses. Both of them are adapted for retaining the marking element 32 in the through-opening 30.

In the condition with the marking element 32 mounted to the diaphragm 14, the extensions 46, 48 are furthermore arranged on opposite sides of the diaphragm 14. In the present case, the extension 46 is always positioned on the upper side 34 and the extension 48 is always positioned on the lower side 36.

In other words, each of the extensions 46, 48 blocks the marking element 32 from being pushed out in one direction. In this way, the marking element 32 is axially firmly held in the through-opening 30.

In the embodiments according to FIGS. 8, 9, 11, 12 and 13, the marking element 32 is substantially circular cylindrical, with a cross-section in the middle portion of the marking element 32 corresponding to a cross-section of the through-opening 30.

In these exemplary embodiments, the extensions 46, 48 extend around the whole circumference and may also be referred to as thickened diameter portions.

Moreover, the axial end faces 50, 52 of the extensions 46, 48 facing the middle portion of the marking element 32 each rest against the diaphragm 14. In other words, there is no gap between the extensions 46, 48 and the diaphragm 14. These embodiments are especially insusceptible to dirt deposits. They are also easy to clean.

In the embodiment according to FIG. 8, a circumference of the marking element 32 and a circumference of the associated through-opening 30 are selected such that the marking element 32 and the through-opening 30 form an interference fit. This means that the circumference of the marking element 32 is slightly larger than the circumference of the through-opening 30. It is only the elasticity of the diaphragm 14 that allows the marking element 32 to be inserted in the through-opening 30.

The marking element 32 is held in the through-opening 30 with a force fit.

The same applies to the embodiment according to FIG. 10. In this case, in addition, a lateral surface 54 of the marking element is convex.

In contrast to the other marking elements 32, the marking element 32 according to FIGS. 12 and 13 has a two-part design. Here, the two parts of the marking element 32 are snap-locked to each other.

This ensures that the marking element 32 remains in the through-opening 30 even in the case of vibrations or shocks as may occur in valve operation.

The invention claimed is:

1. A diaphragm assembly for a diaphragm valve, comprising:
a diaphragm which includes a functional portion adapted to cooperate with further components of the diaphragm valve and to separate opposite chambers; and
a tab projecting laterally from the functional portion, wherein a through-opening is provided in the tab, and a marking element is fastened in the through-opening;
wherein the diaphragm is a multilayer diaphragm, and the through-opening extends through all layers of the multilayer diaphragm;
wherein in an installed position, the diaphragm comprises an upper side and a lower side; and
the marking element has substantially the same color as the lower side, the color being an indicator for the material on the lower side, or
the marking element is made from the same material as the lower side, or
the marking element has a shape being an indicator for the material on the lower side.

2. The diaphragm assembly according to claim 1, wherein the marking element is visible from a viewing direction directed onto the upper side.

3. The diaphragm assembly according to claim 1, wherein the marking element protrudes in relation to at least one of an upper boundary surface and to a lower boundary surface of the diaphragm.

4. The diaphragm assembly according to claim 1, wherein the marking element includes at least one lateral extension for retaining the marking element in the through-opening.

5. The diaphragm assembly according to claim 4, wherein the marking element includes two lateral extensions for retaining the marking element in the through-opening, the lateral extensions being arranged on opposite sides of the diaphragm in the assembled state.

6. The diaphragm assembly according to claim 4, wherein the marking element includes a lateral extension on each of the two axial ends for retaining the marking element in the through-opening, and wherein an axial end face of each extension facing the middle portion rests against the diaphragm.

7. The diaphragm assembly according to claim 1, wherein the marking element is substantially cylindrical and the through-opening has a cross-section substantially corresponding to a cross-section of the marking element.

8. The diaphragm assembly according to claim 7, wherein a circumference of the cylindrical marking element is larger than a circumference of the through-opening such that the marking element and the through-opening form an interference fit.

9. The diaphragm assembly according to claim 1, wherein the marking element comprises an electronic data storage element, in particular an RFID chip.

10. The diaphragm assembly according to claim 9, wherein the marking element comprises a data readout interface for reading out data stored on the electronic data storage element and/or a data write interface for writing data to the electronic data storage element.

11. The diaphragm assembly according to claim 9, wherein a visual display device is provided, which is coupled to the electronic data storage element.

12. The diaphragm assembly according to claim 11, wherein the visual display device is an indicator light.

13. A diaphragm valve comprising a diaphragm assembly for a diaphragm valve, comprising a diaphragm which includes a functional portion adapted to cooperate with further components of the diaphragm valve and to separate opposite chambers, and a tab projecting laterally from the functional portion, wherein a through-opening is provided in the tab, and a marking element is fastened in the through-opening;
wherein the diaphragm is a multilayer diaphragm, and the through-opening extends through all layers of the multilayer diaphragm;
wherein in an installed position, the diaphragm comprises an upper side and a lower side; and
the marking element has substantially the same color as the lower side, the color being an indicator for the material on the lower side, or
the marking element is made from the same material as the lower side, or
the marking element has a shape being an indicator for the material on the lower side.

14. A diaphragm assembly for a diaphragm valve, comprising:
a diaphragm which includes a functional portion adapted to cooperate with further components of the diaphragm valve and to separate opposite chambers; and
a tab projecting laterally from the functional portion, wherein a through-opening is provided in the tab, and a marking element is fastened in the through-opening;
wherein the diaphragm is a multilayer diaphragm, wherein a first diaphragm layer is an elastomer layer and a second diaphragm layer is made of PTFE;
wherein in an installed position, the diaphragm comprises an upper side and a lower side; and
the marking element has substantially the same color as the lower side, the color being an indicator for the material on the lower side, or
the marking element is made from the same material as the lower side, or
the marking element has a shape being an indicator for the material on the lower side.

15. A diaphragm valve comprising a diaphragm assembly for a diaphragm valve, comprising a diaphragm which includes a functional portion adapted to cooperate with further components of the diaphragm valve and to separate opposite chambers, and a tab projecting laterally from the functional portion, wherein a through-opening is provided in the tab, and a marking element is fastened in the through-opening;
wherein the diaphragm is a multilayer diaphragm, wherein a first diaphragm layer is an elastomer layer and a second diaphragm layer is made of PTFE;
wherein in an installed position, the diaphragm comprises an upper side and a lower side; and
the marking element has substantially the same color as the lower side, the color being an indicator for the material on the lower side, or
the marking element is made from the same material as the lower side, or
the marking element has a shape being an indicator for the material on the lower side.

* * * * *